April 18, 1950   C. C. WHITE   2,504,608
WOVEN SYNTHETIC RESIN STORAGE BATTERY
RETAINER WITH RIBS
Filed April 29, 1943

INVENTOR
CURTICE C. WHITE
BY
Augustus B. Stoughton
ATTORNEY

Patented Apr. 18, 1950

2,504,608

UNITED STATES PATENT OFFICE 2,504,608

WOVEN SYNTHETIC RESIN STORAGE BATTERY RETAINER WITH RIBS

Curtice Chandler White, Johnsville, Pa., assignor to The Electric Storage Battery Company, a corporation of New Jersey Application April 29, 1943, Serial No. 484,950

4 Claims. (Cl. 136—143)

This invention relates to retainers for use between the plates of a storage battery cell, and more particularly to flat retainers consisting of a woven or knitted fabric.

Flat retainers of felted inert fibrous material, such as glass wool, have been employed heretofore in storage battery cells but such retainers are not self-supporting, unless stiffened by the application of a suitable binder, thus introducing considerable difficulty and additional cost. Furthermore, in order to secure the desirable ultimate porosity, the stiffening agent is usually such that it will dissolve or be otherwise removed before the battery is put in service. If it becomes necessary to dismantle such battery cells, the retainers can only be removed as shapeless masses, unfit for further use. Moreover, if the porosity of such felted retainers is sufficiently open to permit the desirable circulation and diffusion of the electrolyte over the surface of the plates the active material is not effectively retained but will lodge in the interstices and cause short circuits.

If the porosity is made sufficiently fine effectively to retain the active material, circulation of the electrolyte is provided for by the introduction of additional separators such as ribbed and grooved diaphragms of wood, thus increasing the dimensions and cost of the battery. In other cases it has been proposed to apply and attach by an adhesive, or otherwise, separate parallel strips of suitable material to the face of an otherwise flat porous separator or retainer in order to provide the necessary channels for circulation. Such ribs obstruct the porosity at the surfaces to which they are applied and also substantially increase the production cost.

It is an object of this invention to produce a fabric retainer of synthetic resin, inert to the strong oxidizing and electrochemical reactions in a storage battery, to which has been imparted marked rigidity and whose porosity has been reduced and controlled by a novel step in the process of production.

A further object is the production of such a fabric retainer having a series of permanent parallel ribs and corresponding channels incorporated as an integral part of the structure during the process of fabrication.

Another object is the production of such a fabric retainer, either flat or ribbed, by the use of a molecularly oriented thread of synthetic resin and a novel step following the process of fabrication, comprising the application of a critical elevated temperature whereby increased strength and elasticity are imparted to the component threads, the porosity is reduced, and the retainer is rendered self-supporting and sufficiently rigid for handling and insertion between the plates during assembly.

Another object is the production of a retainer fabricated from molecularly oriented threads of synthetic resin and applied to the storage battery plate in the form of an envelope surrounding the plate and shrunken after such application tightly to grip the plate.

Further objects and advantages of this invention will become apparent as the following description proceeds and the features of novelty which characterize this invention will be set forth in the claims appended to and forming a part of this specification.

In accordance with this invention a fabric is produced from molecularly oriented threads of certain synthetic resin materials. It has been found that such threads have the property of shrinking when subjected to a predetermined elevated temperature. This property, normally considered detrimental, is utilized to produce a self-supporting, more or less rigid but flexible fabric retainer, either flat or having parallel ribs and corresponding channels. A fabric retainer made in accordance with the invention hereinafter more fully disclosed has been found to be self-supporting and suitably rigid yet pliable and free from brittleness to permit handling during assembly. Further, it is found that these properties are retained so that a battery cell, after use, may be dismantled and the retainers reassembled with the same or other plates.

For a more complete understanding of the invention, reference should be had to the following detailed description read in connection with the accompanying drawing in which.

Figure 1:
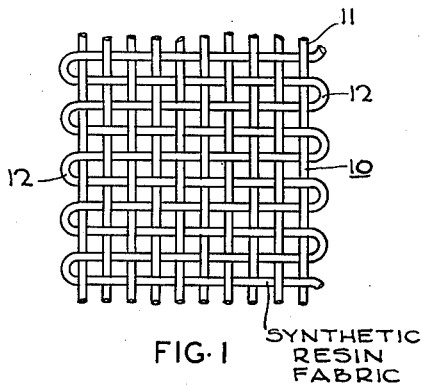
Figure 1 shows in plan view a portion of a flat woven retainer involving features of this invention.

Referring to Figure 1, there is shown in plan view a portion of a flat woven fabric retainer 10 having threads 11 and selvage edges 12. The texture of this fabric is that of ordinary woven material and it may be produced in a continuous strip, of sufficient width to allow for the shrinkage hereinafter described, and thereafter cut into pieces of desired length. While a woven fabric is illustrated, a knitted fabric of well known type may be employed if desired, it being deemed unnecessary to illustrate this.

In producing the retainer 10 there is employed in accordance with this invention threads 11 made from a synthetic resin inert to the powerful oxidizing and electrochemical reactions in a storage battery cell and capable of being produced in the form of a thread suitable for weaving or knitting. The synthetic resins which have been found to be suitable for carrying out this invention are acid-resisting solid linear polymers the principal chain of which is a straight chain single bond carbon to carbon linkage. Among these polymers, solid polymerized vinyl esters such as polyvinyl chloride, polyvinyl acetate and their copolymers; the acrylic resins, such as polymerized methyl-methacrylate and ethyl-methacrylate; and polystyrene have been found to be particularly suitable.

It is customary in the manufacture of thread from such resins to orient the molecules in order to add sufficient strength and elasticity to the thread to permit weaving or knitting. This orientation may be produced by a stretching operation at elevated temperatures and subsequent cooling or by other methods.

The synthetic resin fabric for the retainer 10 as it comes from the weaving or knitting is similar to other fabrics of the same size thread in that it is quite flimsy and not self-supporting. It is impractical to insert such material between the plates of assembled groups and it is necessary to stack the separate plates and retainers alternately and horizontally superimposed, after which the plates are lead burned to appropriate positive and negative straps in the usual manner. This method of assembly is considerably more costly than that employed where the retainers are comparatively rigid and self-supporting and can be inserted between the intermeshed plates of assembled groups. Moreover, the minimum porosity obtainable in such fabric produced on standard commercial looms or knitting machines is not sufficiently fine to be completely effective in preventing the escape in service of active material from the plates to which such retainers are applied.

It has been found that molecularly oriented synthetic resin thread or a fabric made therefrom, if subjected to an elevated temperature lower than that required to produce softening of the material or tackiness at the surface will shrink by a substantial fraction of its original length without sacrifice of strength or elasticity. This property is utilized to overcome the difficulties described in the previous paragraph. More specifically the retainer material after it has been woven or knitted is, in accordance with this invention, subjected to an elevated temperature whereupon shrinkage occurs resulting in a marked increase in the rigidity of the material and a considerable reduction in its porosity. By controlling the temperature and time of subjection of the material to a specific temperature varying degrees of rigidity and porosity can be achieved.

The material may be subjected to the appropriate elevated temperature by passing it through a heated oven or immersing it in a heated fluid such as water or dilute sulphuric acid.

The temperature employed must be sufficiently high to produce the desired amount of shrinkage but not so high as to produce softening or surface tackiness of the component threads which would cause welding. It has been found that for molecularly oriented threads of polymerized methly-methacrylate a temperature between 170° F. and 200° F. is satisfactory. For polymerized ethyl methacrylate and polystyrene, a temperature between 140° F. and 160° F. may be employed. For the other suitable synthetic resins, enumerated as suitable for use in this application, suitable temperatures below those producing tackiness or softening can readily be ascertained by those skilled in the art from the specific examples set forth.

Figure 2:
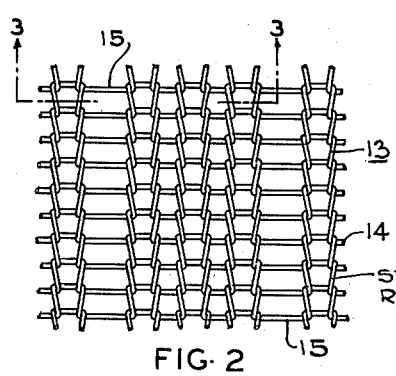
Figure 2 shows in plan view and to a magnified scale the structure of a portion of a knitted fabric adapted for the production of a ribbed retainer in accordance with this invention.

In Figure 2 there is shown a modified structure comprising a flat knitted fabric 13 of synthetic resin thread 14. In producing this fabric on a knitting machine of any well known type, a needle stitch or loop is omitted by leaving a needle or needles out of action leaving a loop 15. It will be noted that the loops 15 in successive rows are contiguous and there is thus produced in the finished fabric a series of parallel so-called "runs." As explained, in connection with Figure 1, the fabric of Figure 2 may be knitted in the form of a continuous strip of a width suitable to provide the desired width of the finished retainer with selvage edges, the strip, after final processing, being cut into pieces of desired length.

Figure 3:
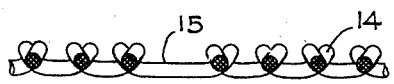
Figure 3 is a section in elevation taken on the line 3—3 of Figure 2.

As shown in Figures 2 and 3, before the shrinkage step of my invention, the fabric is flat, similar to any other flat knitted fabric. This fabric is then subjected to the shrinkage step at elevated temperature, as explained in connection with Figure 1, with the result that the "runs" are raised in the form of ribs as shown at 15a in Figure 4, while between these ribs the fabric is curved in the opposite direction, as shown at 16.

There is thus produced a retainer of fabricated threads of synthetic resin, inert to the severe oxidizing and electro-chemical reactions in a storage battery cell, provided with ribs on one side and corresponding channels on the other side, said ribs and channels being integrally incorporated in the structure of the retainer.

Figure 4:
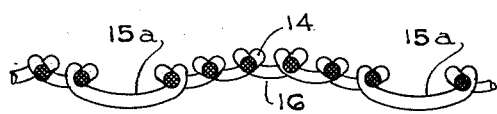
Figure 4 is a section similar to Figure 3, taken after the shrinkage step in the process and shows the details of construction of a finished retainer.

In either case, whether the resulting retainer is flat, as shown in Figure 1, or ribbed as in Figure 4, it is sufficiently rigid and pliable to permit handling and insertion between the plates of intermeshed groups during assembly and of reduced porosity as compared with that of the untreated fabric; and in the case of the ribbed retainer, the ribs and channels retain their form in service.

Another advantage of the ribbed fabricated retainers above described resides in the fact that on account of the resilience of the individual threads and their freedom from attachment at contiguous points the retainers are slightly compressible at right angles to their faces, thus accommodating slight variations in the thickness of the plates with which they are assembled while maintaining the desired over-all thickness of the assembled plate group.

Figure 5:
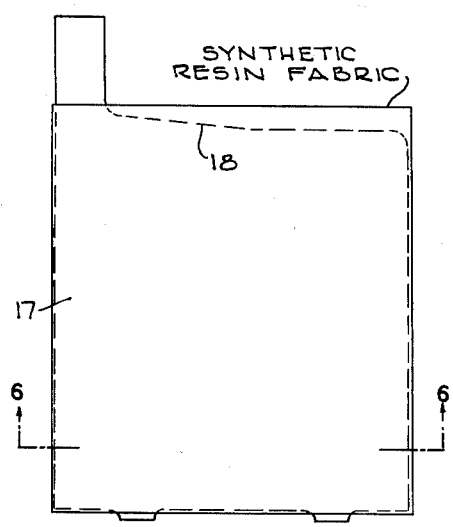
Figure 5 shows in elevation a modification in which a storage battery plate is enclosed in an envelope type of retainer embodying features of the invention.
Figure 6:
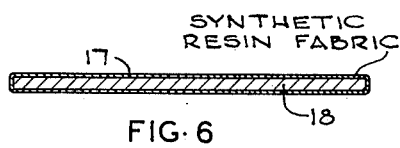
Figure 6 shows a horizontal section on the line 6—6 of Figure 5.

In Figures 5 and 6 is shown a modification in which the retainer is in the form of an envelope 17 completely surrounding the plate 18 horizontally, covering both faces and the vertical edges of the plate. As explained in connection with Figures 1-4, the retainer is fabricated, either by weaving or knitting, from threads of synthetic resin which during the process of manufacture have been subjected to an orientation process such as stretching at elevated temperature and cooled while under stress. It may be fabricated in the form of a continuous sleeve of suitable circumference to fit loosely over the plate 18. This sleeve is then cut into lengths which, after shrinkage, will slightly more than cover the vertical dimension of the plate 18. After this sleeve has been applied to the plate, the assembled plate 18 and retainer 17 are subjected to an elevated temperature suitable to produce marked shrinkage, as already described. This shrinkage will cause the retainer tightly to grip the plate so that the plate with its enveloping retainer can be handled as a unit and can be assembled with other similar units into appropriate plate groups in the usual manner without danger of relative displacement of the retainers. Obviously, the retainer of this modification may be either flat or ribbed as above described.

This phase of my invention is covered in my U. S. Patent No. 2,420,456 issued May 13, 1947 on an application filed on the same date as this application and assigned to the assignee of this application.

The term "active material," as used throughout this specification and in the appended claims, is intended to include the material applied to the grid whether potentially or actually active, i. e., whether before or after the initial forming charge.

While there have been illustrated and described specific embodiments of this invention, modifications therein will be apparent to those skilled in the art. It is not desired therefore that this invention be limited to the specific embodiments shown and described and it is intended in the appended claims to cover all modifications which come within the true spirit and scope of this invention.

I claim:

1. In the process for producing, for use between the plates of a storage battery, a ribbed retainer from molecularly oriented threads of synthetic resin insoluble in the electrolyte and inert to the oxidizing and electro-chemical reactions in the battery, the steps of, knitting the fabric with needles omitted at intervals to produce parallel runs or open wales in the knitted fabric, and subjecting the knitted fabric to elevated temperature below that at which surface tackiness is produced whereby the threads are shrunken to curve the runs or open wales transversely into parallel ribs and introduce rigidity and self-sustaining characteristics into the fabric.

2. A retainer for use between the plates of a lead-acid storage battery comprising a knitted fabric of threads of initially molecularly oriented filaments of synthetic resin insoluble in the electrolyte and resistant to the oxidizing and electrochemical reactions in the battery, said fabric provided with parallel ribs integral with the structure of the fabric, said ribs comprising a series of drop stitch loops of shrunken threads at corresponding points in consecutive rows constituting transversely curved rib-like elevations above the adjacent surface of the fabric.

3. A retainer for use between the plates of a lead-acid storage battery comprising a knitted fabric of threads of initially molecularly oriented filaments of a synthetic resin of the class consisting of the vinyl resins, methacrylate resins, and polystyrene, said fabric provided with parallel ribs integral with the structure of the fabric, said ribs comprising a series of drop stitch loops of shrunken threads at corresponding points in consecutive rows, constituting transversely curved, rib-like elevations above the adjacent surface of the fabric.

4. A storage battery flat retainer comprising a fabric primarily knitted with over size pores and rows of drop stitches from threads of initially molecularly oriented filaments of synthetic resin insoluble in the electrolyte and resistant to the oxidizing and electrochemical reactions in a storage battery, the threads of said fabric being shrunken to reduce the pores to a predetermined size and provide a corrugated structure.

CURTICE CHANDLER WHITE.

REFERENCES CITED

The following references are of record in the file of this patent:

UNITED STATES PATENTS

| Number | Name | Date |
|---|---|---|
| 1,051,637 | Rodman | Jan. 28, 1913 |
| 1,432,938 | Wood et al. | Oct. 24, 1922 |
| 1,474,830 | Lyndon | Nov. 20, 1923 |
| 1,829,231 | Mergentime | Oct. 27, 1931 |
| 2,156,455 | Kleine et al. | May 2, 1939 |
| 2,176,428 | Kershaw | Oct. 17, 1939 |
| 2,200,134 | Schlack | May 7, 1940 |
| 2,277,782 | Rugeley | Mar. 31, 1942 |
| 2,281,606 | Snader | May 5, 1942 |
| 2,282,274 | Weiswasser et al. | May 5, 1942 |
| 2,298,708 | Lochhead | Oct. 13, 1942 |
| 2,309,370 | Williams | Jan. 26, 1943 |
| 2,335,757 | Hall | Nov. 30, 1943 |
| 2,355,822 | Rugeley | Aug. 15, 1944 |
| 2,420,456 | White | May 13, 1947 |

OTHER REFERENCES

Richardson, H. M., Electrical World, April 17, 1943, pages 67, 68.

Goggin et al., Ind. & Eng. Chem. vol. 34, March 1942, page 331.

Goggin et al., Modern Plastics, July 1944, page 101.